United States Patent
Wang et al.

(10) Patent No.: US 9,807,662 B2
(45) Date of Patent: Oct. 31, 2017

(54) METHOD AND APPARATUS FOR DEVICE HANDOVER

(75) Inventors: Ying Wang, Beijing (CN); Guoqing Li, Beijing (CN); Li Chen, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 0 days.

(21) Appl. No.: 14/002,114

(22) PCT Filed: Jan. 13, 2012

(86) PCT No.: PCT/CN2012/070336
§ 371 (c)(1),
(2), (4) Date: Aug. 28, 2013

(87) PCT Pub. No.: WO2012/097707
PCT Pub. Date: Jul. 26, 2012

(65) Prior Publication Data
US 2014/0031038 A1    Jan. 30, 2014

(30) Foreign Application Priority Data
Jan. 19, 2011    (CN) .......................... 2011 1 0021598

(51) Int. Cl.
H04W 36/00    (2009.01)
H04W 36/26    (2009.01)
H04W 4/06    (2009.01)

(52) U.S. Cl.
CPC ....... H04W 36/26 (2013.01); H04W 36/0083 (2013.01); H04W 4/06 (2013.01)

(58) Field of Classification Search
CPC .... H04W 36/26; H04W 36/0083; H04W 4/06
(Continued)

(56) References Cited

U.S. PATENT DOCUMENTS 9,185,682 B2 *  11/2015  Hsu ...................... H04W 72/00
2006/0251019 A1 *  11/2006  Dalsgaard et al. ........... 370/331
(Continued)

FOREIGN PATENT DOCUMENTS

CN    101335990 A    12/2008
CN    101873645 A    10/2010
(Continued)

OTHER PUBLICATIONS

International Search Report of PCT/CN2012/070336, dated Apr. 19, 2012.

*Primary Examiner* — Khai M Nguyen
(74) *Attorney, Agent, or Firm* — Oliff PLC

(57) ABSTRACT

Disclosed in the present invention are a method and an apparatus for device handover, which belongs to the mobile communication field. The method comprises the following steps: obtaining a Multimedia Broadcast Multicast Service (MBMS) service configuration information of neighbor cells; selecting a target cell for a user equipment according to the MBMS service configuration information of the neighbor cells and the MBMS service reception information of the user equipment; handing over the user equipment to the target cell. The apparatus comprises: an acquiring module, for obtaining the Multimedia Broadcast Multicast Service (MBMS) service configuration information of the neighbor cells; a selecting module, for selecting a target cell for a user equipment according to the MBMS service configuration information of the neighbor cells and the MBMS service reception information of the user equipment; a handover module, for handing over the user equipment to the target cell. With the implementation of the technical solution that the MBMS service configuration information of the neighbor cells is obtained, the target cell for the user equipment is selected according to the MBMS service configuration information and the MBMS service reception
(Continued)

information of the user equipment, and the user equipment is handed over to the target cell, the present invention enables the user equipment to switch to an appropriate target cell.

12 Claims, 2 Drawing Sheets

(58) Field of Classification Search
USPC .................................. 455/436, 437, 438, 439
See application file for complete search history.

(56) References Cited

U.S. PATENT DOCUMENTS

| | | | |
|---|---|---|---|
| 2007/0135153 A1* | 6/2007 | Cai et al. ....................... | 455/522 |
| 2008/0287129 A1* | 11/2008 | Somasundaram | H04W 36/0055 |
| | | | 455/436 |
| 2010/0216471 A1* | 8/2010 | Meyer ................... | H04W 36/26 |
| | | | 455/436 |
| 2010/0272004 A1* | 10/2010 | Maeda .................. | H04L 5/0007 |
| | | | 370/312 |
| 2012/0236776 A1* | 9/2012 | Zhang .................. | H04W 48/12 |
| | | | 370/312 |
| 2014/0031038 A1 | 1/2014 | Wang et al. | |

FOREIGN PATENT DOCUMENTS

| | | |
|---|---|---|
| CN | 102075866 A | 5/2011 |
| WO | 2011015137 A1 | 2/2011 |

\* cited by examiner

METHOD AND APPARATUS FOR DEVICE HANDOVER

CROSS REFERENCE TO RELATED APPLICATIONS

This application is the National Stage of PCT/CN2012/070336 filed on 13 Jan. 2012, which claims priority under 35 U.S.C. §119 of Chinese application no. 201110021590.9, filed on Jan. 19, 2011, the disclosure of which is incorporated by reference. The international application under PCT article 21(2) was not published in English.

FIELD OF THE PRESENT INVENTION

The present invention relates to the field of mobile communication, in particular to the method and apparatus for device handover.

BACKGROUND OF THE PRESENT INVENTION

MBMS (Multimedia Broadcast/Multicast Service) is used for providing the users in the wireless cells with multimedia broadcast and multicast service. The MBMS service needs to support MBSFN (Multimedia Broadcast Single Frequency Network) transmission mode during the transmission of multi-cells. See FIG. 1, which gives the relationship between MBMS service area and MBSFN synchronization area. MBMS service area is composed of one or more service identifications, each identification being mapped to one or more MBSFN areas.

When a UE (User Equipment) receiving MBMS service moves in different MBSFN areas or moves to the boundary within the same MBSFN area, source base station may conduct area handover of the UE.

At present, the source base station is mainly to select a cell of better signal quality from the measurement report of the UE and handover the UE to the selected cell.

The above handover procedure may result in the MBMS service interruption of the UE. For example, the handover target cell for the source base station according to the measurement report of the UE may be cell 2 or cell 3, supposing the cell 2 supports MBMS service and cell 3 does not support, the source base station may switch the UE to cell 3, thus leading to MBMS service of the UE become interrupted.

SUMMARY OF THE PRESENT INVENTION

For solving the above problem, the embodiments of the present invention put forward a method and apparatus for device handover. Said technical solution is specified as follows:

A method for device handover, which comprises the steps of:

Obtaining a multimedia broadcast multicast service (MBMS) service configuration information of the neighbor cells;

Selecting a target cell for said user equipment according to the MBMS service configuration information of the neighbor cells and the MBMS service reception information of the user equipment;

Handing over said user equipment to the target cell.

An apparatus for device handover, which comprises: an acquiring module, a selecting module and a handover module;

Said acquiring module is used for obtaining multimedia broadcast multicast service (MBMS) service configuration information of the neighbor cells;

Said selecting module is used for selecting a target cell for the user equipment according to the MBMS service configuration information and the MBMS service reception information of the user equipment;

Said handover module is used for handing over the user equipment to the target cell.

The technical solution of the embodiments of the present invention brings the following beneficial effects: with the implementation of the technical solution that the MBMS service configuration information of the neighbor cells is obtained, the target cell for the user equipment is selected according to the MBMS service configuration information and the MBMS service reception information of the user equipment, and the user equipment is handed over to the target cell, the present invention enables the user equipment to switch to an appropriate target cell.

DETAILED DESCRIPTION OF THE EMBODIMENTS OF THE PRESENT INVENTION

To make the purpose, technical solution and advantages of the present invention clearer, the implementation mode of the present invention are explained in a detailed way with reference to the drawings.

Embodiment I

Figure 1:
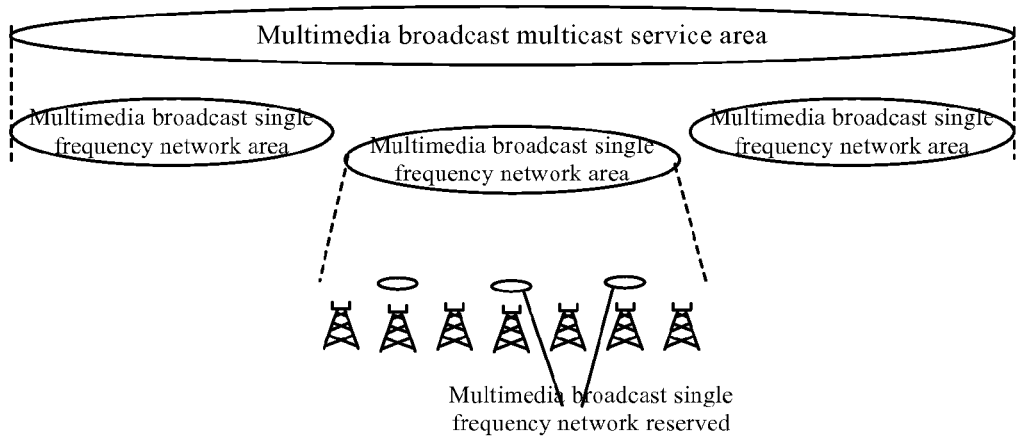
FIG. 1 is the relationship diagram for the MBMS service area and MBSFN synchronization area provided in the Background of the present invention.
Figure 2:
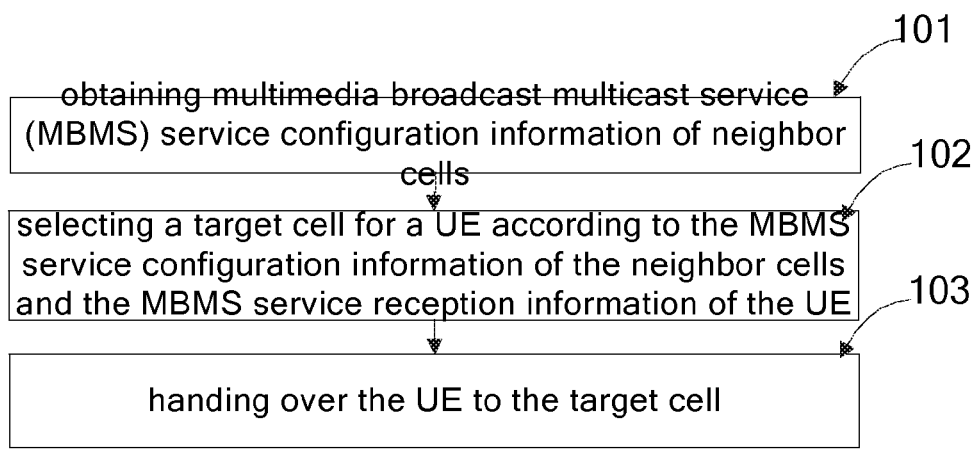
FIG. 2 is the flow diagram of the method for device handover provided in the Embodiment I of the present invention.

See FIG. 2, a method for device handover; the executive bodys of said method comprise a base station or a network node, etc., which are not specifically limited in the present invention, said method specially comprises:

Step 101: obtaining multimedia broadcast multicast service (MBMS) service configuration information of neighbor cells;

Step 102: selecting a target cell for a user equipment according to the MBMS service configuration information of the neighbor cells and the MBMS service reception information of the user equipment;

Step 103: handing over the user equipment to the target cell.

The technical solution provided by the embodiments of the present invention brings the following beneficial effects: with the implementation of the technical solution that the MBMS service configuration information of the neighbor cells is obtained, the target cell for the user equipment is selected according to the MBMS service configuration information and the MBMS service reception information of the user equipment, and the user equipment is handed over to the target cell, the present invention enables the user equipment to switch to an appropriate target cell.

Figure 3:
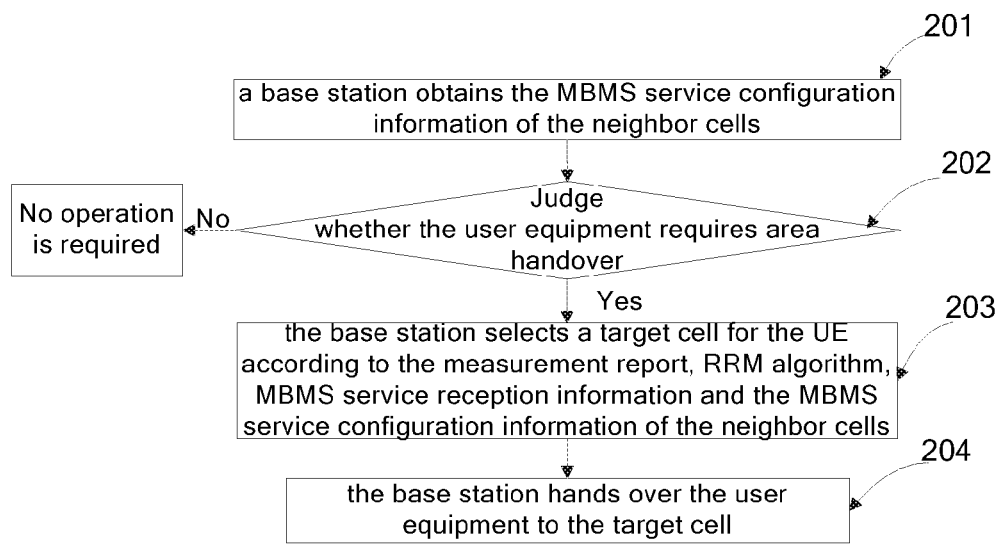
FIG. 3 is the flow diagram of the method for device handover provided in the Embodiment I of the present invention.

In the following parts, the method for device handover is explained in a detailed way with reference to the drawings; the executive body of said method comprises a base station or a network node, etc., which is not specifically limited in the present invention. See FIG. 3, said method specially comprises:

Step 201: a base station obtains the MBMS service configuration information of the neighbor cells;

Wherein, the MBMS service configuration information at least comprises: the Multimedia Broadcast Single Frequency Network (MBSFN) area ID, cell information, MBMS service identification, MBMS session identification and MBMS service area identification; therein, the cell information comprises: reserved cell information of the Multimedia Broadcast Single Frequency Network (MBSFN) area and non-reserved cell information of the Multimedia Broadcast Single Frequency Network (MBSFN) area.

To be specific, the base station obtains the MBMS service configuration information of the neighbor cells comprises one of the following modes:

Mode I, obtaining the MBMS service configuration information of the neighbor cells from the MCE (Multi-Cell/Multicast Coordination Entity), the concentrated node at a radio access network side;

Prior to the detailed description of this mode, it should be known that, in the logical architecture of the MBMS service of LTE (Long Term Evolution) system, MCE refers to the concentrated node at RAN is (Radio Access Network) side, responsible for the allocation of MBSFN resources; M2 interface refers to the logic interface between the MCE and the base station, is used to transfer the MBMS service configuration information of cells, M2 interface is referred to as the third communication interface in this embodiment.

From the above, the MBMS service configuration information of the neighbor cells can be obtained from the MCE through the third communication interface M2; comprising: initiating a third communication interface establishment request message to the MCE, the concentrated node at the radio access network side, and receiving the MBMS service configuration information of the neighbor cells returned by the MCE;

Or, initiating a base station configuration update message to the MCE, the concentrated node at radio access network side, and receiving the MBMS service configuration information of the neighbor cells returned by the MCE;

Or, receiving the MBMS service configuration information of the neighbor cells carried in the MCE configuration update message which is initiated by the MCE, the concentrated node at the radio access network side.

Wherein, initiating the third communication interface establishment request message to the MCE, the concentrated node at the radio access network side, and receiving the MBMS service configuration information of the neighbor cells returned by the MCE, comprises the following steps:

Step 201-1: the base station eNB initiates a third communication interface M2 establishment request message to the MCE, said message carries the MBMS service configuration information of the neighbor cells stored by itself;

Step 201-2: the MCE returns the third communication interface M2 establishment response message to the base station eNB after the MCE receives the third communication interface M2 establishment request message;

Step 201-3: the base station eNB receives and stores the MBMS service configuration information of the neighbor cells returned in the third communication interface M2 establishment response message;

Wherein, receiving the MBMS service configuration information of the neighbor cells carried in the MCE configuration update message which is initiated by the MCE, the concentrated node at the radio access network side, comprises the following steps:

Step 201-4: when the MBMS service configuration information of the neighbor cells is changed, the base station eNB initiates a base station configuration update message to the MCE; the base station configuration update message carries the MBMS service configuration information of the neighbor cells stored by the base station eNB;

Step 201-5: the MCE stores the MBMS service configuration information of the neighbor cells carried in the base station configuration update message after the MCE receives the base station configuration update message, and returns the base station configuration update confirmation message to the base station eNB;

Step 201-6: after the base station eNB receives the base station configuration update confirmation message, the base station eNB updates and stores the MBMS service configuration information of the neighbor cells stored by itself according to the MBMS service configuration information carried in the base station configuration update confirmation message;

Or

Step 201-7: When the MBMS service configuration information of the neighbor cells is changed, the MCE initiates the MCE configuration update message to the base station eNB;

Step 201-8: after the base station eNB receives the MCE configuration update message, the base station eNB updates the MBMS service configuration information of the neighbor cells stored by itself according to the MBMS service configuration information of the neighbor cells carried in the MCE configuration update message;

Step 201-9: the base station eNB returnes the MCE configuration confirmation message to the MCE and informs that the application layer data, sent by the MCE, which the MCE requests to update has been implemented successfully.

Mode II, obtaining the MBMS service configuration information of the neighbor cells from the first communication interface, wherein, the first communication interface specifically refers to a manual operation interface OAM (Operation Administration and Maintenance). It comprises the following steps:

Step 201-10: the base station eNB sends the Neighbor Relationship (NR) report message to the first communication interface OAM when neighbor cells establish or update the MBMS service configuration information;

Step 201-11: after the first communication interface OAM receives the NR report message, the first communication interface OAM returns the Add/Update NR message to the base station eNB;

Step 201-12: after the base station eNB receives the Add/Update NR message, the base station eNB stores the MBMS service configuration information of the neighbor cells or updates the MBMS service configuration information of the neighbor cells stored by itself according to the MBMS service configuration information of the neighbor cells carried in the Add/Update NR message;

Mode III, obtaining the MBMS service configuration information of the neighbor cells from the establishment or update process of the second communication interface, comprising;

Step 201-13: the base station eNB1 initiates a second communication interface X2 establishment request message to a base station of the neighbor cell eNB2;

Step 201-14: after the base station of the neighbor cell eNB2 receives the X2 establishment request message, the eNB2 stores the MBMS service configuration information of management cell carried in the second communication interface X2 establishment request message, and returns the second communication interface X2 establishment response message to the base station eNB1;

Step 201-15: after the base station eNB1 receives the second communication interface X2 establishment response message, the base station eNB1 stores the MBMS service configuration information of management cell carried in the second communication interface X2 establishment response message;

Or,

Step 201-16: the base station of the neighbor cell eNB1 initiates a base station configuration update message to the base station eNB2;

Step 201-17: after the base station eNB2 receives the base station configuration update message, the base station eNB2 updates the MBMS service configuration information of the neighbor cells stored by itself according to all of the added or modified MBMS service configuration information of the base station carried in the base station configuration update message;

Step 201-18: the base station eNB2 sends a base station configuration update confirmation message to the base station of the neighbor cell eNB1, and informs that the application layer data, sent by the base station of the neighbor cell eNB1, which the base station configures to update has been implemented successfully.

Step 202: the base station judges whether the user equipment (UE) requires area handover, if yes, executes step 203, or else no processing is required;

To be specific, whether the user equipment requires area handover is judged according to the radio-frequency signal strength, carrier-to-interference ratio, relative position of the base station and the user equipment, and the bit error rate, for example, when the base station detects that signal strength is lower than a preset threshold value, the base station performs area handover on the user equipment, which will be not limited in the embodiment of the present invention.

Step 203: the base station selects a target cell for the UE according to the measurement report, RRM (Radio Resource Management) algorithm, MBMS service reception information and the MBMS service configuration information of the neighbor cells, therein, all of these information is reported by the UE;

It specifically comprises:

Step 203-1A: the base station selects a cell with the MBMS service configuration information of the neighbor cells matching with the MBMS service reception information as a target cell;

Step 203-2A: the base station judges whether the signal quality of the target cell is higher than a preset value; if yes, executes step 204, or else executes step 203-3A;

Step 203-3A: the base station selects a cell with the signal quality higher than a preset value as the target cell for the user equipment from the measurement report that the UE reports, wherein, the measurement report that the UE reports includes the cell signal quality indicators;

Or,

Step 203-1B: the base station selects cells with the signal quality higher than a preset value as candidate cells to be handed over for the user equipment according to the measurement report that the UE reports, wherein, the measurement report that the UE reports includes the cell signal quality indicators;

Step 203-2B: the base station selects a cell with the MBMS service configuration information of the neighbor cells matching with the MBMS service reception information as a target cell from the candidate cells to be handed over; the base station selects a cell from the candidate cells to be handed over as the target cell if there is no cell with the MBMS service configuration information of the neighbor cells matching with the MBMS service reception information from the candidate cells to be handed over;

Step 204: the base station hands over the user equipment to the target cell;

The technical solution provided in the embodiments of the present invention brings the following beneficial effects: with the implementation of the technical solution that the MBMS service configuration information of the neighbor cells is obtained, the target cell for the user equipment is selected according to the MBMS service configuration information and the MBMS service reception information of the user equipment, and the user equipment is handed over to the target cell, the present invention enables the user equipment to switch to an appropriate target cell; such as handing over the user equipment to a cell which supports the MBMS service, so as to ensure the MBMS service continuity of the user equipment, or handing over the user equipment to a cell of higher signal quality, thus ensuring the unicast services of the user equipment.

Embodiment II

Figure 4:
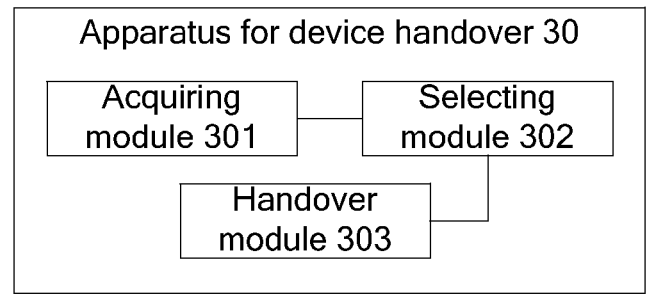
FIG. 4 is the flow diagram of the apparatus for device handover provided in the Embodiment II of the present invention.

See FIG. 4, an apparatus for device handover, said apparatus corresponds to the base station or network node in the Embodiment I specifically, which is not limited in the embodiments of the present invention. The apparatus 30 comprises: an acquiring module 301, a selecting module 302 and a handover module 303;

The acquiring module 301, is used to obtain the multimedia broadcast multicast service (MBMS) service configuration information of the neighbor cells;

The selecting module 302, is used to select a target cell for a user equipment according to the MBMS service configuration information obtained by the acquiring module 301 and the MBMS service reception information of the user equipment;

The handover module 303, is used to hand over the user equipment to the target cell selected by the selecting module 302.

The technical solution provided in the embodiments of the present invention brings the following beneficial effects: with the implementation of the technical solution that the MBMS service configuration information of the neighbor cells is obtained, the target cell for the user equipment is selected according to the MBMS service configuration information, and the user equipment is handed over to the target cell, the present invention enables the user equipment to switch to an appropriate target cell.

Figure 5:
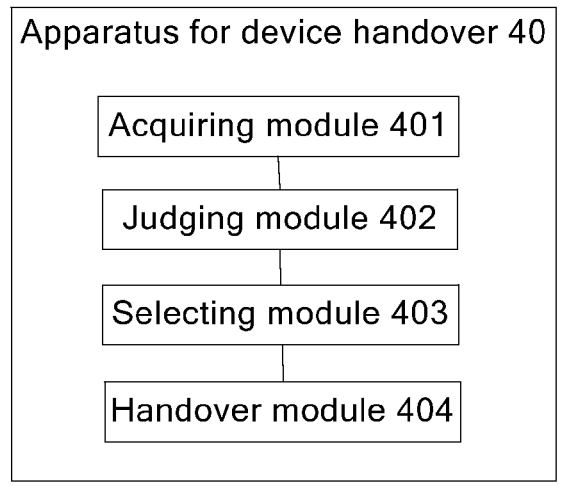
FIG. 5 is the flow diagram of the apparatus for device handover provided in the Embodiment II of the present invention.

In the following parts, the apparatus for device handover is explained in a detailed way with reference to the drawings. See FIG. 5, said apparatus 40 comprising: an acquiring module 401, a judging module 402, a selecting module 403 and a handover module 404;

The acquiring module 401, is used to obtain multimedia broadcast multicast service (MBMS) service configuration information of the neighbor cells;

A first acquiring unit, is used to obtain the MBMS service configuration information of the neighbor cells from MCE, the concentrated node at the radio access network side;

Or, a second acquiring unit, is used to obtain the MBMS service configuration information of the neighbor cells from the first communication interface;

Or, a third acquiring unit, is used to obtain the MBMS service configuration information of the neighbor cells from the establishment or update process of the second communication interface.

Wherein, the first acquiring unit, is specifically used to initiate a third communication interface establishment request message to the MCE, the concentrated node at the radio access network side, and receives the MBMS service configuration information of the neighbor cells returned by the MCE;

Or, the first acquiring unit is specifically used for initiating a base station configuration update message to the MCE of the concentrated nodes at the radio access network side and receiving the MBMS service configuration information of the neighbor cells returned by the MCE;

Or, the first acquiring unit, is specifically used to receive the MBMS service configuration information of the neighbor cells carried in the MCE configuration update message which is initiated by the MCE, the concentrated node at the radio access network side.

Wherein, the second acquiring unit, is specifically used to send the neighbor relationship report message to the first communication interface, and receives the MBMS service configuration information of the neighbor cells returned by the first communication interface.

The third acquiring unit, is specifically used to initiate a second communication interface establishment request message(s) to the base station(s) of the neighbor cell(s) and receives the MBMS service configuration information of the neighbor cells returned by the base station(s) of the neighbor cell(s);

Or, the third acquiring unit, is specifically used to receive the MBMS service configuration information of the neighbor cells carried in the base station configuration update message(s) which are initiated by the base station(s) of the neighbor cell(s).

In specific implementation, the first communication interface refers to manual operation interface OAM; the second communication interface refers to X2 interface, and the third communication interface refers to M2 interface.

The judging module 402, is used to judge whether the user equipment is handed over.

To be specific, the judging module 402 is used for judging the handover of the UE according to the measurement report and RRM algorithm that UE reports; wherein, the measurement report that UE reports includes cell signal quality indicators, when the cell signal quality obtained is lower than a preset threshold value, it is considered that UE will be handed over.

The selecting module 403, is used to select a target cell for the user equipment according to the MBMS service configuration information obtained by the acquiring module 401 and the MBMS service reception information of the user equipment;

To be specific, the selecting module 403 comprises: A first selecting unit, is used to select a cell with the MBMS service configuration information of the neighbor cells matching with the MBMS service reception information of the user equipment as a target cell;

A judging unit, is used to judge whether the signal quality of the target cell is lower than a preset value.

A second selecting unit, is used to select a cell with the signal quality higher than the preset value as the target cell when the judging result from the judging unit is yes;

Or,

A third selecting unit, is used to select a cells with the signal quality higher than said preset value as candidate cells to be handed over;

A fourth selecting unit, is used to select a cell with the MBMS service configuration information of the neighbor cells matching with the MBMS service reception information of the user equipment as the target cell from the candidate cells to be handed over;

A fifth selecting unit, is used to select a cell from the candidate cells to be handed over as the target cell if there is no cell with the MBMS service configuration information of the neighbor cells matching with the MBMS service reception information of the user equipment in the candidate cells to be handed over.

The handover module 404, is used to hand over the user equipment to the target cell selected by the selecting module 403.

The technical solution provided in the embodiments of the present invention brings the following beneficial effects: with the implementation of the technical solution that the MBMS service configuration information of the neighbor cells is obtained, the target cell for the user equipment is selected according to the MBMS service configuration information, and the user equipment is handed over to the target cell, the present invention enables the user equipment to switch to an appropriate target cell; such as handing over the user equipment to a cell which supports the MBMS service so as to ensure the MBMS service continuity of the user equipment, or handing over the user equipment to a cell of higher signal quality, thus ensuring the unicast services of the user equipment.

The technical solutions provided in the above embodiments can be partially or completely implemented by software programming, the software programs thereof are stored in a readable storage medium, such as hard disk, CD-ROM or floppy disk of a computer.

The descriptions above are just preferred implement ways of the present invention. It should be pointed that, any modifications within the spirit and principles of the present invention, equivalent replacements, improvements, etc., should be included within the protection scope of the present invention.

The invention claimed is:

1. A method for device handover, comprising:
when the user equipment moves into a different MBSFN area or moves to the boundary within the same MBSFN area:
obtaining, by a processor of a base station or network node, multimedia broadcast multicast service (MBMS) service configuration information of one or more neighbor cells from one of: a concentrated Multi-Cell/Multicast Coordination Entity (MCE) node on the radio access network side, a first interface that is a manual Operation Administration and Maintenance (OAM) interface, or an establishment or update process of a second interface that is an X2 communication interface;

selecting, by the processor of the base station or network node, from among the one or more neighbor cells, a handover target cell with MBMS service configuration information that corresponds to the MBMS service reception information of a user equipment that is to be handed over; and handing over, by the processor of the base station or network node, the user equipment to the handover target cell with the MBMS service configuration information that corresponds to the MBMS service reception information of the user equipment that is to be handed over.

2. The method according to claim 1, wherein the method comprises:
  obtaining, by the processor of the base station or network node, the MBMS service configuration information of the one or more neighbor cells from the MCE node, which comprises at least one of:
    initiating, by the processor of the base station or network node, transmission of a third M2 interface establishment request message to the concentrated MCE node, and receiving, by the processor, the MBMS service configuration information of the one or more neighbor cells from the concentrated MCE node,
    initiating, by the processor of the base station or network node, transmission of a base station configuration update message to the concentrated MCE node, and receiving, by the processor, the MBMS service configuration information of the one or more neighbor cells from the concentrated MCE node, or
    receiving, by the processor of the base station or network node, the MBMS service configuration information of the one or more neighbor cells carried in a MCE configuration update message initiated by the MCE node.

3. The method according to claim 1, the method comprises: obtaining, by the processor of the base station or network node, the MBMS service configuration information of the one or more neighbor cells from the OAM interface, which comprises sending, by the processor, a neighbor relationship report message to the OAM interface, and receiving, by the processor, the MBMS service configuration information of the one or more neighbor cells from the OAM interface.

4. The method according to claim 1, wherein the method comprises: obtaining, by the processor of the base station or network node, the MBMS service configuration information of the one or more neighbor cells from the establishment or update process of the X2 interface, which comprises at least one of:
  initiating, by the processor of the base station or network node, an X2 interface establishment request message(s) to the base station(s) of the one or more neighbor cells, and receiving, by the processor, the MBMS service configuration information of the one or more neighbor cells from the base station(s) of the one or more neighbor cells, or
  receiving, by the processor of the base station or network node, the MBMS service configuration information of the one or more neighbor cells carried in the base station configuration update message(s) which is(are) initiated by the base station(s) of the one or more neighbor cell(s).

5. The method according to claim 1, wherein the selecting, by the processor of the base station or network node, of the handover target cell with the MBMS service configuration information corresponding to the MBMS service reception information of the user equipment comprises:
  selecting, by the processor of the base station or network node, a cell, based on the obtained MBMS service configuration information of the one or more neighbor cells, that matches with the obtained MBMS service reception information of the user equipment, as the handover target cell;
  judging, by the processor, whether a signal quality of the handover target cell is lower than a preset value; and
  when the signal quality of the handover target cell is lower than the preset value:
    selecting, by the processor of the base station or network node, another cell of the one or more neighbor cells with a signal quality higher than the preset value as the handover target cell; or
    selecting, by the processor of the base station or network node, cells of the one or more neighbor cells having a signal quality higher than the preset value as candidate cells to be handed over, and one of:
      selecting, by the processor of the base station or network node, a cell from the selected candidate cells to be handed over, based on the obtained MBMS service configuration information of the one or more neighbor cells, that matches with the obtained MBMS service reception information of the user equipment as the handover target cell; or
      selecting, by the processor of the base station or network node, a cell from the selected candidate cells to be handed over as the handover target cell if none of the candidate cells to be handed over match with the obtained MBMS service configuration information of the one or more neighbor cells.

6. The method according to claim 1, wherein the processor of the base station or network node performs the steps of claim 1, when the user equipment moves into a different MBSFN area or moves to the boundary within the same MBSFN area.

7. The method according to claim 1, wherein the selected handover target cell has MBMS service configuration information that matches the MBMS service reception information of the user equipment that is to be handed over.

8. An apparatus for device handover, comprising:
  a processor of a base station or network node programmed to:
  when the user equipment moves into a different MBSFN area or moves to the boundary within the same MBSFN area:
    obtain multimedia broadcast multicast service (MBMS) service configuration information of one or more neighbor cells from one of: a concentrated Multi-Cell/Multicast Coordination Entity (MCE) node on the radio access network side, a first interface that is a manual Operation Administration and Maintenance (OAM) interface, or an establishment or update process of a second interface that is an X2 interface;
    select, from among the one or more neighbor cells, a handover target cell with MBMS service configuration information that corresponds to the MBMS service reception information of a user equipment that is to be handed over; and
    hand over the user equipment to the selected handover target cell with the MBMS service configuration information that corresponds to the MBMS service reception information of the user equipment that is to be handed over.

9. The apparatus according to claim 8, wherein the processor of the base station or network node is further programmed to at least one of:
  initiate an M2 interface establishment request message to the concentrated MCE node, and receive the MBMS service configuration information of the one or more neighbor cells from the concentrated MCE node;
  initiate a base station configuration update message to the concentrated MCE node, and receive the MBMS service configuration information of the one or more neighbor cells from the concentrated MCE node; or
  receive the MBMS service configuration information of the one or more neighbor cells carried in the MCE configuration update message which is initiated by the concentrated MCE node.

10. The apparatus according to claim 8, wherein the processor of the base station or network node is further programmed to send a neighbor relationship report message to the OAM interface, and receive the MBMS service configuration information of the one or more neighbor cells from the OAM interface.

11. The apparatus according to claim 8, wherein the processor of the base station or network node is further programmed to at least one of:
  initiate one or more second communication interface establishment request message to one or more base stations of the one or more neighbor cells, and receive the MBMS service configuration information of the one or more neighbor cells from the one or more base stations of the one or more neighbor cells; or
  receive the MBMS service configuration information of the one or more neighbor cells carried in one or more base station configuration update messages which are initiated by the one or more base stations of the one or more neighbor cells.

12. The apparatus according to claim 8, wherein the processor of the base station or network node is further programmed to:
  select a cell, based on the obtained MBMS service configuration information of the one or more neighbor cells, that matches with the obtained MBMS service reception information of the user equipment, as the handover target cell;
  judge whether a signal quality of the handover target cell is lower than a preset value; and
  when the signal quality of the handover target cell is lower than the preset value:
    select another cell of the one or more neighbor cells with a signal quality higher than the preset value as the handover target cell; or
    select cells of the one or more neighbor cells having a signal quality higher than the preset value as candidate cells to be handed over, and one of:
      select a cell from the selected candidate cells to be handed over, based on the obtained MBMS service configuration information of the one or more neighbor cells, that matches with the obtained MBMS service reception information of the user equipment as the handover target cell; or
      select a cell from the selected candidate cells to be handed over as the handover target cell if none of the candidate cells to be handed over match with the obtained MBMS service configuration information of the one or more neighbor cells.

* * * * *